F. NOBLE.
MEANS FOR TREATING WATER, SEWAGE, AND LIQUID MANUFACTURING WASTE.
APPLICATION FILED SEPT. 17, 1913.
1,211,481.  Patented Jan. 9, 1917.
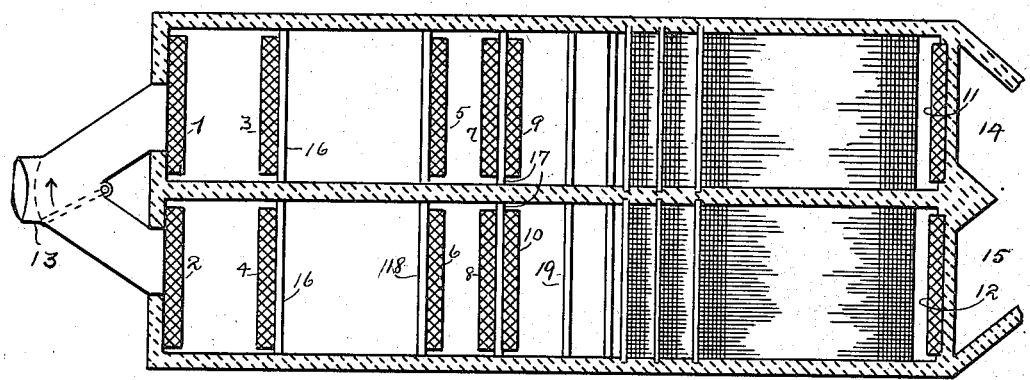
Fig 1.
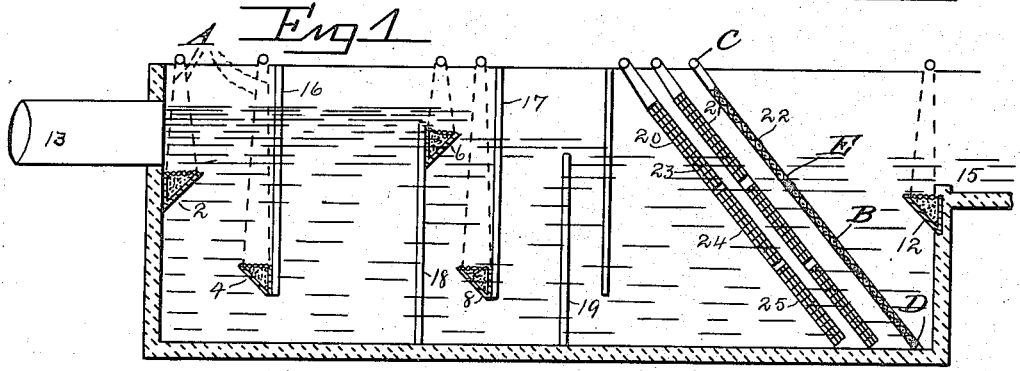
Fig 2.
Fig 3.
WITNESSES  INVENTOR
Franklin Noble
BY
ATTORNEY

UNITED STATES PATENT OFFICE.

FRANKLIN NOBLE, OF BROOKLYN, NEW YORK.

MEANS FOR TREATING WATER, SEWAGE, AND LIQUID MANUFACTURING-WASTE.

1,211,481. Specification of Letters Patent. Patented Jan. 9, 1917.

Application filed September 17, 1913. Serial No. 790,180.

*To all whom it may concern:*

Be it known that I, FRANKLIN NOBLE, of the borough of Brooklyn, county of Kings, city and State of New York, have invented certain new and useful Improvements in Means for Treating Water, Sewage, and Liquid Manufacturing-Wastes, of which the following is a specification, reference being had to be annexed drawing, forming a part thereof, in which—

Figure 1 is a plan view, partly in section of my improved form of tank or chamber for treating liquids. Fig. 2 is a vertical sectional view of my improved tank with my improved device therein showing the method of use thereof. Fig. 3 shows in perspective the means for substituting one of the charcoal screens.

My invention relates to improvements in the chemical and mechanical treatment of drinking water, sewage and liquid manufacturing waste for a purifying effect thereon.

It is my purpose to perform such treatment in such manner as will permit of the continuous flow of such liquids and avail of the force of such flow to effect adequate mixing and chemical contact of the agents employed to produce efficient purifying results, thereby dispensing with use of mechanical power appliances and very large tanks otherwise necessary, and likewise facilitate the separation and retention of suspended matter without impeding the flow of said liquids.

A suitable mixture of powdered carbonate of lime and powdered hypochlorite of lime upon saturation with water will evolve hypochlorous acid gas, which gas upon contact with water will decompose the latter, setting free nascent oxygen, this latter agent in this state,—the most efficient known to science,— will effectually destroy bacteria upon contact therewith and likewise appreciably oxidize the mineral and organic matter in the liquids to facilitate the precipitation and sedimentation thereof. This method of liberating oxygen from water itself in a large volume of water enables surcharging water with free oxygen much exceeding the capacity of water to hold such from an added application of oxygen, thus affording a very effective and protracted oxidization process for water and sewage purification. For this purpose I have devised a receptacle as shown at 1 to 12 inclusive for said chemicals, constructed of wood and having its upper end closed only by a wire screen work of such fine mesh as to practically exclude sediment and suspension matter, yet admit water into the receptacle to come in adequate contact with a quantity of the mixture of lime carbonate and calcium hypochlorite placed therein, and also to permit the hypochlorous acid gas then evolved as well as water surcharged with nascent oxygen, passing out through the screen into the surrounding liquid. Owing to the active oxidizing effect from the oxygen thus produced and the use of small size wire, I use wire of copper, brass, aluminum or other ductile metal not appreciably injured by oxidization, or a suitable fiber may be used.

In order to accomplish effective treatment, both chemical and mechanical of the water, sewage or liquid manufacturing waste, I have devised an elongated tank or chamber for the liquids to pass through, entering by the pipe 13 and passing out by the broad channels 14 and 15, and I arrange one or more vertical transverse baffles or barriers 16, 17 therein. By extending such baffles down in manner to form a narrow elongated opening across the tank between the bottom terminal of the baffle and the bottom of the tank, of an area greater than that of the inlet pipe, I insure the passing of the entire volume of liquid through the tank in a wide shallow stream without impeding the flow.

I purpose having said receptacles containing the chemicals of a length nearly equal to the width of the tank and placing them supported, preferably by flexible cords A approximately parallel and in close proximity to the sides of the tank. This placement of the receptacles approximately parallel and at about right angles to the flow of the current, provides a larger area of treatment thereof by the hypochlorous acid gas and water surcharged with oxygen evolved from said receptacle; thus accomplishing thorough chemical treatment of the entire column of liquid without impeding said flow. I purpose placing the receptacles in approximately as close proximity to said openings under said baffles as possible so as to obtain adequate treatment of the liquid passing thereunder and yet to present the smallest possible interference to the flow of the current. While the use of one such receptacle for one chemical application may suffice in obtaining adequate purification under some conditions, two or more such applications give assurance of better purification results.

In the past it has been usual to use calcium hypochlorite alone but I have found that the hypochlorite produces a quickly evolved and particularly fugitive gas, too rapid in its operation to be of continued value. If a small quantity is used the results are not satisfactory, but if a large quantity be used the result is an objectionable chlorination of the water at the outset and no material action of any nature at a later stage. I have therefore added carbonate of lime to the hypochlorite obtaining thereby a hypochlorous acid gas and prolonging the action of the chlorid and obtaining a treatment just as efficient and of a much greater duration. Also free chlorin may be set free which combines with the hydrogen of the water setting free the oxygen by decomposing the water. The carbonate of lime mixed with the hypochlorite materially slows the action of the hypochlorite preventing it from a quick discharge of its gas and making practically impossible an over chlorination of the water.

By my construction of baffles and barriers, suspended matter of small specific gravity is separated and retained in the tank, without retarding the flow of the liquid, to be removed and disposed of when desired. I also provide one or more vertical transverse partitions or barriers 18, 19, to serve as weirs in said tank, with their tops at such height or water level relative to the level of the liquid in the inlet of the pipe discharging into the tank, as to provide approximately the same area or passage way permitting the natural flow of the liquid over such partitions, and I place an elongated receptacle containing the chemicals, approximately parallel and in close proximity to the passageway over the weir in a position not to greatly impede the flow of liquid passing over said partition—but so that the evolving hypochlorous acid gas and water surcharged with free oxygen from the receptacle, will be brought in intimate contact with the entire volume of liquid passing in a broad shallow stream over the top of the receptacle, thereby accomplishing thorough chemical treatment and resultant purification by sterilization and oxidization of both mineral and organic polluting matter. I also provide the terminal end walls of the tanks with the outlets 14—15, at such elevation, that the wall serves as a weir, and together with the weirs 18 and 19 are at suitable relative water levels to admit of a progressive flow over them of the liquid passing through said tank. By such construction heavy suspended matter and sediment will be separated and retained in the tank, for subsequent removal and disposal without interfering with the flow during treatment. And by the aforesaid construction of baffles, barriers and partitions and elevated outlets the entire process of treatment can be conducted with but a slight retardation of the flow, or loss of head as it is termed,—a feature essential, if costly and troublesome pumping of the entire volume of the liquid is to be dispensed with.

For the purpose of separating and retaining free flowing suspended matter not detained by barriers or partitions, I may use one or more charcoal or coke strainers 20 and 21, and one or more cocoa fiber matting or wire strainers 22, placed in the tank transversely across and approximately at an angle of 45 degrees to the surface or water level of the liquid passing through said tank. By inclining these, if clogging materials should accumulate on the surface of such strainers the force of the flow itself will tend to force such accumulation off, making the strainer when in that position, to a certain extent self-freeing of surface clogging. The placing of the strainers at such incline also affords as is desirable, a larger area of filtering surface, than if the strainers were perpendicular.

As some parts of a strainer in service will fill up or clog much sooner than others, I have devised such strainer mainly of a wire screenwork frame filled with coke or charcoal and in several sections or interchangeable parts, 23, 24, 25, to lessen the frequency of cleansing or renewing the charcoal; and one part or section only may be cleaned or renewed; instead of the whole, as would be necessary if the strainer entire was made in one complete part. I use charcoal or coke in this service because of their known high purification efficiency in filtration. Additionally by reason of said strainers being made in sections they are much more readily handled and require less room for so doing, which may be a desirable feature. This also applies to my devising the cocoa matting strainers without rigid side frames, but having preferably flexible cord side supports B, connecting the bar or rod C across the top of the strainer, with a similar bar or rod D attached to the bottom end of the strainer, and a third bar E near the middle, the middle and lower end bars or rods moving up and down, when the strainer is placed in or removed from the tank, and the whole being guided by channels 26 or grooves in the side walls of the tank, enabling the strainer upon removal to be rolled up in a similar manner to a window shade. I purpose using cocoa fiber matting for such strainer of open texture fabric, because it is durable and the many loose ends of fiber aid in the filtering service.

An important feature of my device and its operation rests in the fact that I may place my device at tide level or even below and thus obtain the full value of a gravity flow into the tank. It is true that the device would be submerged at high water, but to submerge it would not destroy its usefulness to any degree. When tide water is flowing over the device it is not necessary to provide a high degree of purification as the tide water will carry away the polluted water, leaving the sediment and suspended matter within the tanks, and when the tide recedes the device will quickly assume an operative condition. This function as peculiar as it must seem, is not to be found in any other device of a like nature.

Modifications may be made within the scope of the appended claims without departing from the principle or sacrificing the advantages of this invention.

I have described and shown a woven wire, or wire mesh cover for each of the smaller receptacles, but I desire it understood that I may dispense with these covers if it is found desirable to do so. I have also described my device as operating with a gravity flow only but it is obvious that the flow may be produced by any desirable means. It may be found that, under certain conditions it will be advisable to increase the velocity of the passing liquid, but I prefer to utilize gravity wherever it is possible to do so.

I have described the use of calcium hypochlorite and carbonate of lime admixed in proper proportions, but I may under some conditions find it advisable to dispense with the carbonate although I prefer the whole as shown and described.

Having carefully and fully described my invention what I claim and desire to secure by letters patent is:—

1. The method herein described of treating polluted liquid, which consists of receiving such liquid into a tank and passing said liquid through perforated receptacles containing calcium hypochlorite and carbonate of lime.

2. The method herein described of treating polluted liquid which consists of receiving said liquids into a tank, flowing said liquid in a broad and shallow stream through said tank, passing said liquids through and under perforated receptacles containing hypochlorite of lime, and causing said liquids to deposit their suspended matter within said tank as herein specified.

3. The herein described method of purifying liquids which consists of intimately mingling therewith hypochlorous acid gas evolved by the action of said liquid upon calcium hypochlorite and carbonate of lime as herein specified and for the purpose set forth.

4. The method herein described of treating polluted liquid for the purification thereof which consists in applying chlorin by means of receptacles arranged approximately at right angles to and on both sides of a broadened and shallowed flow of said liquid and causing said flow to promote a uniform mixing of said chlorin therewith.

5. The method herein described of treating polluted liquids which consists in submerging in said liquids receptacles containing calcium hypochlorite and calcium carbonate and saturating said chemicals with the liquid wherein they are submerged to evolve hypochlorous acid gas therefrom, and diffusing said gas through said liquids to obtain oxidizing purifying effects.

6. The method herein described of treating polluted liquids and of obtaining a prolonged oxidizing effect from a given amount of chlorin which consists in introducing into said liquids calcium hypochlorite to evolve hypochlorous acid gas and a retardant for the purpose set forth.

7. The method herein described of treating polluted liquids which consists in directing the flow of said liquids through a circuitous passage introducing calcium hypochlorite therein, evolving hypochlorous acid gas, and causing said circuitous flow to uniformly and intimately mix and prolong the treatment of said gas.

Signed at New York city, in the county of New York, and State of New York this 5th day of August 1913.

FRANKLIN NOBLE.

Witnesses:
G. E. STERRETTE,
ARTHUR PHELPS MARR.